July 4, 1961    A. F. MILLER    2,990,751
REAR VISION MIRRORS FOR AUTOMOBILES
Filed March 1, 1956    2 Sheets-Sheet 1
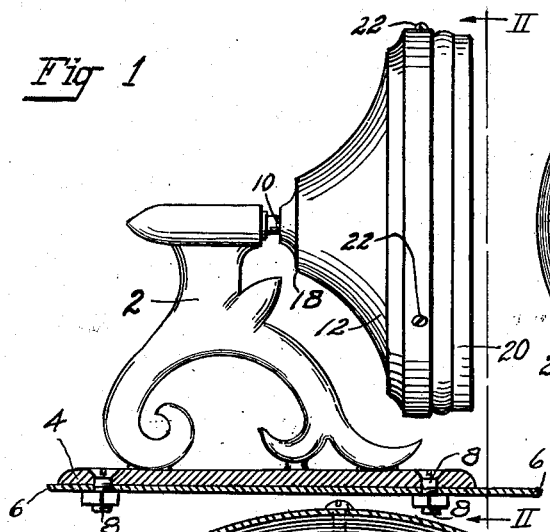
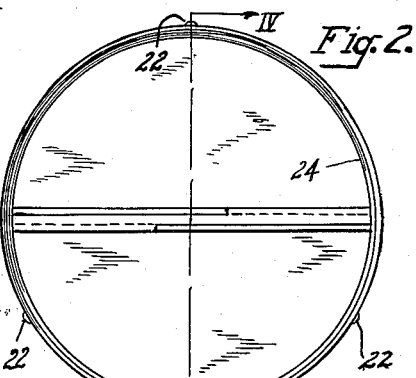
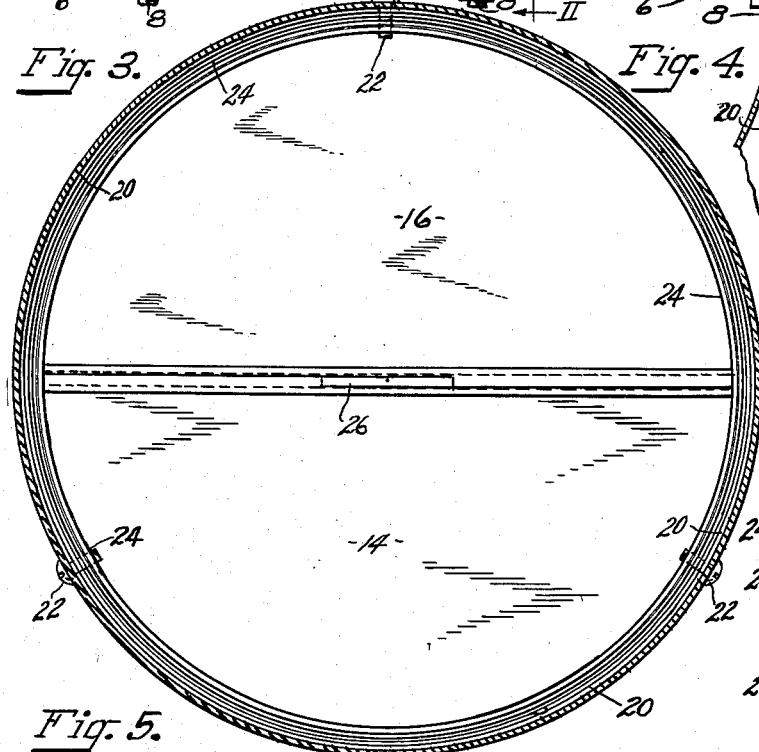
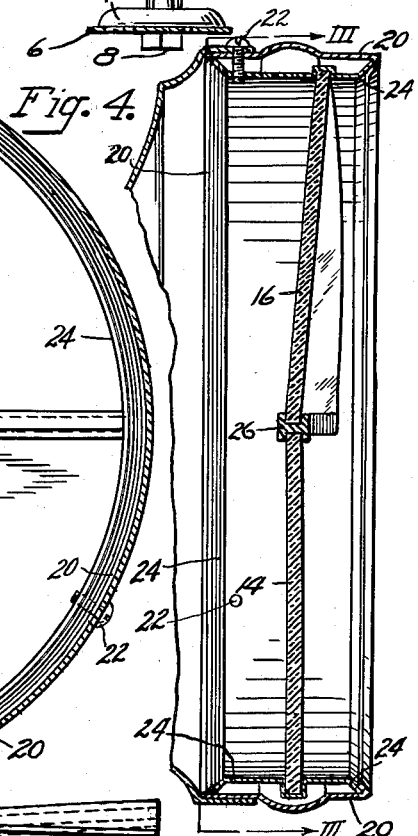
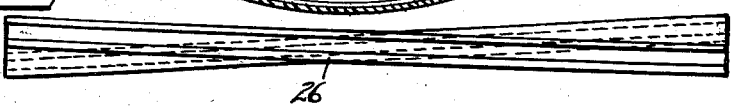
INVENTOR,
ALBERT F. MILLER.
BY
Hamilton & Hamilton,
Attorneys.

July 4, 1961  A. F. MILLER  2,990,751
REAR VISION MIRRORS FOR AUTOMOBILES
Filed March 1, 1956  2 Sheets-Sheet 2
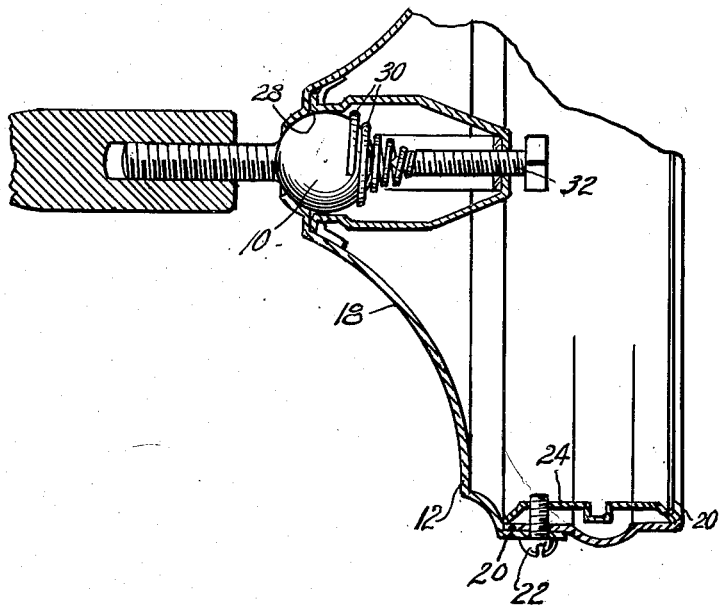
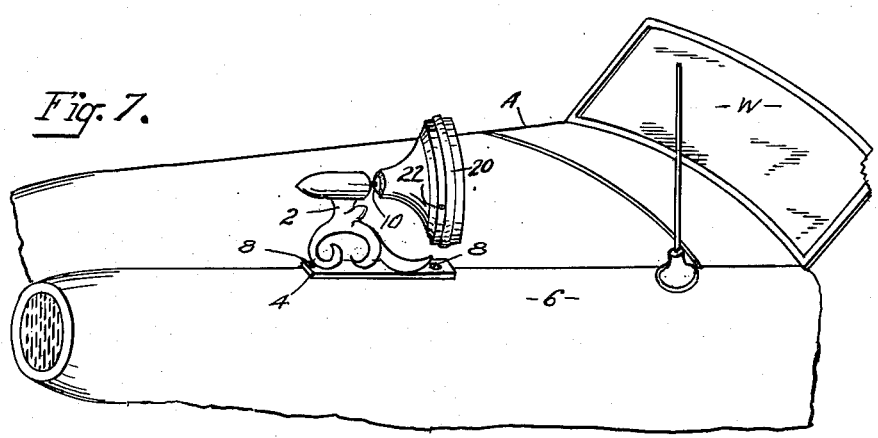
INVENTOR,
ALBERT F. MILLER.
BY
Hamilton & Hamilton
Attorneys.

United States Patent Office 2,990,751
Patented July 4, 1961

2,990,751
REAR VISION MIRRORS FOR AUTOMOBILES
Albert F. Miller, 940 Ballantyne Lane, El Cajon, Calif.
Filed Mar. 1, 1956, Ser. No. 568,849
2 Claims. (Cl. 88—87)

This invention relates to a rear view mirror for an automobile and has particular reference to a rear view mirror for an automobile whereby the driver will have better vision of automobiles approaching from the rear when making left turn or entering the lane to the left of his automobile. Specifically this invention relates to rear view mirrors for automobiles, comprising a frame adapted to be secured to an automobile and carrying two planar mirrors, one of said mirrors being disposed substantially in a vertical plane and the other of said mirrors being tilted about horizontal and vertical axes relative to said mirror whereby another automobile approaching and passing from the rear will be visible to the driver in said mirrors until substantially alongside his automobile. This rear view mirror comprises two mirrors housed in a frame and held in a fixed relative position and at the desired angle to each other both from top to bottom and from left to right. They are made so that when they are adjusted to a position so that the lower mirror shows the cars at the rear of the driver's car and in the same lane then the top mirror will be at the correct angle from the bottom mirror so that any automobile in rear of the driver's automobile which is about to pass will show in the top mirror as it moves out to the left of the driver's automobile in which the mirror is installed. The two views are not confusing as the automobiles do not show in the top mirror except as they are just about to pass and are in the blind spot which occurs when they are out of range of the bottom mirror and are not quite even with this driver's car. As the automobile shown in the lower mirror passes out of sight from the rear view and can no longer be seen in it, then it starts to appear in the top mirror. That is the only time the cars show in the top mirror. These mirrors may be made right and left hand. They may be made round, or square with rounded corners. They may be made oblong for trucks and busses. These may also be made right and left hand meaning the bevels of angles of the mirrors in relation to each other will be made in reversed position from each other. The truck and bus mirrors will be made to fit brackets now being used on trucks and busses. It will also be noted that the bottom and top reflecting mirrors cross each other on the vertical center line of the mirrors.

Other objects are simplicity and economy of construction, ease and efficiency of operation and adaptability for use with any of the various types of automobiles.

With these objects in view as well as other objects which will appear during the course of the specification, reference will be had to the drawings wherein:

FIG. 1 is a side view of rear vision mirror mounted on the side or fender of an automobile.

FIG. 2 is a front view of a rear vision mirror taken on line II—II of FIG. 1.

FIG. 3 is an enlarged front view of the rear vision mirror on line III—III of FIG. 4.

FIG. 4 is an enlarged sectional view taken on line IV—IV of FIG. 2.

FIG. 5 is an enlarged elevational view of the doubled grooved channel member, separating the two reflecting mirrors.

FIG. 6 is an enlarged fragmentary sectional view of the ball and socket mounting for the mirrors shown in the previous views.

FIG. 7 is a fragmentary perspective view of a rear vision mirror positioned on a conventional automobile.

Like numerals refer to similar parts throughout the several views and the numeral 2 designates a bracket having a base 4 secured to fender 6 by means of bolts 8. Bracket 2 carries a ball 10 on which is frictionally supported a mirror frame 12 to carry two mirrors 14 and 16 disposed in angled relation to each other.

Lower mirror 14 is positioned in said frame 12 in a substantially vertical planar position, and mirror 16 is tilted about both horizontal and vertical axes relative to mirror 14. Frame 12 is provided with a formed sheet metal bar 18 which is adjustably fixed to ball 10 whereby these mirrors may be adjusted relative to the roadway while maintaining a constant angled relation to each other. Fixed to bar 18 is a circular band 20 which is fixed to frame 12 by screw 22. A split band 24 associated with double grooved channel 26 carry mirrors 14 and 16 and serve to secure the mirrors in the proper fixed angled relation whereby they will serve to give the driver a better and complete view of the automobiles passing the driver's automobile from the rear. The conventional automobile A shown in FIG. 7, has a windshield W through which the driver views the mirrors 14 and 16.

The ball and socket joint best shown in FIG. 6, includes the ball 10 shown in socket 28 which is urged to its seat by spring 30 which is adjustably urged to the desired tension by screw 32.

Referring to the drawings it will be noted that the screws 22 are positioned about the holder frame 12 at 120° relation so that there will be three equally spaced screws 22. These screws pass through bands 20 and 24 whereby these parts are maintained in the proper fixed relation to indicate the position of the automobiles approaching and passing from the rear.

When assembling the mirrors the band 20 may be set in frame 12 and the band 24 which holds the mirrors is positioned so that the flange on the front edge of 20 holds band 24 in place. The screws 20 may now be set to extend through both bands 20 and 24 to hold them in proper relation to each other.

What I claim as new and desire to protect by Letters Patent is:

1. A rear vision mirror assembly comprising a frame ring, a dividing bar extending across said frame ring, said bar having opposed longitudinal grooves formed therein and opening approximately in the plane of said frame ring, said grooves being angled relative to each other about an axis transverse to said bar and lying in the plane of said frame ring, said frame ring having an inwardly opening circumferential groove formed therein, the portion of said groove at each side of said dividing bar lying in a plane including the adjacent groove of said bar, said planes at the respectively opposite sides of said dividing bar being relatively tilted about said dividing bar as an axis, and a pair of planar mirrors each having its edge portions engaged in one of the grooves of said bar and the frame groove at one side of said bar.

2. A rear vision mirror as recited in claim 1 wherein said frame ring is split at one point in its circumference to permit easy positioning of said dividing bar and mirror sectons therein, and with the addition of a continuous mounting ring encircling said frame ring and secured thereto to prevent opening thereof.

References Cited in the file of this patent
UNITED STATES PATENTS

| | | |
|---|---|---|
| 1,114,559 | Weed | Oct. 20, 1914 |
| 1,570,751 | Langley | Jan. 26, 1926 |
| 1,925,666 | Kerns | Sept. 5, 1933 |
| 2,279,751 | Hensley | Apr. 14, 1942 |
| 2,493,546 | Orser | Jan. 3, 1950 |
| 2,663,224 | Younglove | Dec. 22, 1953 |